United States Patent [19]

Piejko et al.

[11] Patent Number: 5,194,497
[45] Date of Patent: Mar. 16, 1993

[54] ALLOYS OF THERMOPLASTIC POLYMERS CONTAINING OXETANYL GROUPS

[75] Inventors: Karl-Erwin Piejko, Bergisch Gladbach; Gerd Fengler, Krefeld; Holger Lütjens, Cologne; Hans-Eberhard Braese, Cologne; Christian Lindner, Cologne; Jürgen Kirsch, Cologne, all of Fed. Rep. of Germany

[73] Assignee: Bayer Aktiengesellschaft, Leverkusen-Bayerwerk, Fed. Rep. of Germany

[21] Appl. No.: 670,045

[22] Filed: Mar. 15, 1991

Related U.S. Application Data

[63] Continuation-in-part of Ser. No. 459,985, Jan. 2, 1990, abandoned.

[30] Foreign Application Priority Data

Jan. 14, 1989 [DE] Fed. Rep. of Germany ....... 3901030

[51] Int. Cl.$^5$ .............................................. C08L 37/00
[52] U.S. Cl. ........................................ 525/75; 525/93; 525/206; 526/266
[58] Field of Search .................. 526/266; 525/74, 206, 525/75, 93

[56] References Cited

FOREIGN PATENT DOCUMENTS 4323464 10/1968 Japan ................................... 526/266
4725342 7/1972 Japan ................................... 526/266

OTHER PUBLICATIONS

"Crosslinking Polymer" CA 81(24):153514t Kajiyama et al. Feb. 1970.
Hackh's Chemical Dictionary by J. Grant 4th Edition p. 28.

Primary Examiner—Joseph L. Schofer
Assistant Examiner—N. Sarofim
Attorney, Agent, or Firm—Connolly & Hutz

[57] ABSTRACT

Polymer alloys containing resin-like polymers of monomers corresponding to formula (I)

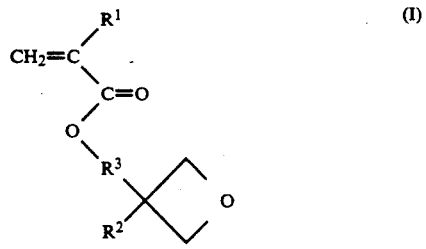

in which
$R^1 = H, CH_3$,
$R^2 = C_{1-8}$ alkylene,
$R^3 = C_{1-4}$ alkyl, and, optionally, other typical vinyl monomers and thermoplastic polymers or graft polymers.

3 Claims, No Drawings

ALLOYS OF THERMOPLASTIC POLYMERS CONTAINING OXETANYL GROUPS

This application is a continuation-in-part of Ser. No. 459,985, filed Jan. 2, 1990, now abandoned, Jun. 17, 1991.

This invention relates to thermoplastic (resin-like) polymers containing oxetanyl groups and to thermoplastic molding compounds produced from them.

Thermoplastic molding compounds containing resin-like polymers, for example styrene/acrylonitrile copolymers or methyl methacrylate polymers, in addition to other thermoplastic, such as polyvinyl chloride or graft polymers (for example ABS, MBS or ASA), are widely used for the production of moldings, such as housings of electrical appliances, profiles and pipes, by injection molding or extrusion. Molding compounds such as these can be damaged by the high processing temperatures prevailing during production of the moldings. This is reflected, for example, in discoloration and cannot be prevented, even by stabilizers. In certain applications of the moldings, for example as housings of domestic appliances, discoloration can also be caused by local overheating. Accordingly, there is a need for materials which show a high thermal stability and which enable moldings having improved mechanical properties, particularly after prolonged use, to be produced.

The present invention relates to resin-like polymers of monomers corresponding to formula (I)

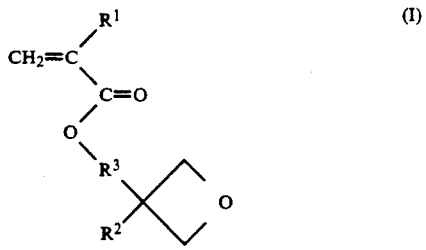

in which
$R^1$ = H, $CH_3$,
$R^2$ = $C_{1-8}$ alkylene,
$R^3$ = $C_{1-4}$ alkyl,
and, optionally, other typical vinyl monomers.

In the present context, "resin-like" means that the polymers are uncrosslinked, have softening temperatures above 30° C. and more especially above 50C and can be processed as thermoplastics.

More particularly, the invention relates to resin-like copolymers of

A1) styrene, α-methylstyrene, acrylonitrile, methacrylonitrile, carboxylic acid $C_{1-4}$ vinyl esters, acrylates, methacrylates, maleic acid derivatives, vinyl chloride, vinylidene chloride and A2) monomers of formula (I) containing oxetanyl groups.

Preferred monomers A1) are styrene, p-methylstyrene, α-methylstyrene, acrylonitrile, methyl methacrylate, n-butyl methacrylate, cyclohexyl methacrylate, n-butyl acrylate, vinyl acetate, maleic acid anhydride, maleic acid imides. Styrene, α-methylstyrene, acrylonitrile and methyl methacrylate are particularly preferred.

Particularly preferred monomers correspond to formula (I) are those in which $R^1$ = H, $CH_3$, $R^2$ = —$CH_2$— and $R^3$ = $CH_3$, $C_2H_5$.

Examples of resin-like copolymers according to the invention are those of styrene and monomers corresponding to formula (I), of methyl methacrylate and (I); terpolymers of styrene, acrylonitrile and (I), of styrene, methyl methacrylate and (I), of α-methylstyrene, acrylonitrile and (I) and also quaterpolymers of α-methylstyrene, methyl methacrylate, acrylonitrile and (I).

The copolymers according to the invention preferably contain polymerized monomers of formula (I) in quantities of up to 50% by weight, preferably in quantities of up to 35% by weight, more preferably in quantities of from 1 to 20% by weight and, most preferably, in quantities of from 2 to 15% by weight (based in each case on the polymer as a whole).

The copolymers according to the invention may be produced from the monomers by radical or thermal polymerization using known copolymerization processes, preferably in organic solvents or in aqueous suspension or emulsion (cf. DE-AS 2 724 360). The polymerization process used must ensure that the oxetanyl groups remain at least largely intact (for example highly acidic medium (pH below 1) and highly alkaline medium (pH above 12) in combination with relatively high temperatures must be avoided during the emulsion polymerization). Copolymers containing oxetanyl groups, which have been produced in aqueous dispersion in mildly alkaline medium, are particularly suitable.

The molecular weight of the copolymers according to the invention may be influenced as usual by the polymerization temperature, the monomer concentration and the quantity of catalyst and by molecular weight regulators. Molecular weight regulators are preferably organosulfur compounds, for example mercaptans or disulfides, particularly long-chain mercaptans, such as n- and tert.-dodecyl mercaptans. The regulators are normally dissolved in the monomer mixture.

The molecular weights Mw (weight average) of the copolymers according to the invention are preferably in the range from 3,000 to 800,00 g/mol and more preferably in the range from 10,000 to 500,000 g/mol (as determined by light scattering or sedimentation).

The monomers used for the production of the copolymers according to the invention, including those corresponding to formula (I), are known.

The present invention relates to thermoplastic molding compounds based on the copolymers according to the invention containing oxetanyl groups. Though the copolymers according to the invention may be used individually as molding compounds, it is preferred to use mixtures of 1) 1–99% by weight, preferably 2–50% by weight of a copolymer according to the invention containing oxetanyl groups and 2) 99 to 1% by weight, preferably 98–50% by weight of a thermoplastic polymer or graft polymer.

Component 2) may be a polymer of one or more monomers A1). Polystyrene, polymethyl methacrylate, polyvinyl chloride, styrene/acrylonitrile copolymers; α-methylstyrene/acrylonitrile copolymers and α-methylstyrene/acrylonitrile/methyl methacrylate copolymers are preferred. Component 2) may also be a graft polymer of vinyl monomers on a rubber base. Particularly suitable rubber bases are diene rubbers, alkylacrylate rubbers, olefin rubbers and silicone rubbers. The graft monomers polymerized in their presence are again preferably the vinyl monomers A1). Preferred graft polymers are at least partly crosslinked and have a particulate structure with mean particle diameters of from 0.1 to 3 μm and preferably from 0.1 to 1 μm. Thermoplastic rubbers, for example natural rubber, olefin rubbers, such as EPDM, ethylene vinyl acetate copolymers, acrylate rubber, diene/styrene block polymers and hydrogenation products thereof, are also suitable as component 2).

Particularly preferred molding compounds according to the invention consist of
1) a copolymer according to the invention containing oxetanyl groups and
2) polyvinyl chloride, or ABS or MBS graft polymer and, optionally
3) a thermoplastic styrene or α-methylstyrene copolymer.

There are preferably homopolymers of styrene, copolymers of styrene and α-methylstyrene all of which can also contain copolymerised acrylonitrile. The amount of these styrene-polymers is 10 to 40% by weight based on the total alloy. Most preferred molding compositions consist of
1) a styrene- or α-methylstyrene copolymer resin containing oxetanyl groups and
2) a thermoplastic graft polymer free of oxetanyl groups (such as graft copolymers of styrene and acrylonitrile onto diene or acrylate rubber of polyvinylchloride).

In the context of the present invention, polyvinyl chloride includes copolymers of vinyl chloride with up to 20%, by weight, of copolymerisable compounds and graft polymers of vinyl chloride on ethylene/vinyl acetate copolymers (particularly having vinyl chloride contents of from 40 to 60%, by weight). Examples of compounds copolymerisable with vinyl chloride include:
a) vinyl esters containing from 1 to 8 carbon atoms in the alkyl radical of the carboxylic acid;
b) vinyl ethers containing from 3 to 7 carbon atoms;
c) maleic acid anhydride;
d) semi-esters of maleic acid with aliphatic alcohols containing from 1 to 8 carbon atoms in the alcohol radical;
e) diesters of maleic acid with aliphatic alcohols containing from 1 to 8 carbon atoms in the alcohol radical.

Vinyl chloride polymers, particularly polyvinyl chloride (PVC), are widely used starting materials. The characteristic property spectrum of vinyl chloride polymers may be varied or modified within wide limits by combination with other substances. Thus, unmodified or only slightly modified PVC molding compositions (so-called "rigid PVC"), for example, are suitable for the production of moldings. These molding compositions show average processing properties, average dimensional stability to heat, moderate toughness and relatively poor flexibility. By combining polyvinyl chloride, for example with so-called plasticizers of low or medium molecular weight, it is possible to produce plastics articles ("flexible PVC") which show high flexibility and elasticity at the use temperatures thereof. The plasticisers used include, for example, phthalates, epoxide compounds, aliphatic diesters, phosphates, polyesters having molecular weights of up to 3000, trimellitates, citrates or certain aliphatic, optionally chlorinated hydrocarbons. These plasticisers are known (see, for example, "Encyclopedia of PVC", Mariel Dekker, Inc. New York, 1976).

In addition, combinations of so-called polymeric plasticisers (polymers of relatively high molecular weight) with vinyl chloride polymers may be used for the production of flexible PVC moldings having improved mechanical properties, for example improved abrasion resistance, elasticity, solvent resistance and, optionally, better flame resistance. Polymeric plasticisers of the type in question are, for example, partially crosslinked butadiene/acrylonitrile copolymers containing up to 30% by weight of acrylonitrile and having Mooney viscosities (ML 4, 100° C. (DIN 53 523)) of from 60 to 100 (cf., for example, EP 0 005 736), certain polyurethanes (German Patent No. 1,193,241) and certain ethylene/vinyl acetate copolymers soluble in organic solvents (cf., for example, EP 0 005 736).

The molding compounds may contain typical additives, such as lubricants and mold release agents, nucleating agents, stabilizers, fillers, reinforcing materials, flameproofing agents, dyes and heat stabilizers, antioxidants and/or light stabilizers. These additives are used in the usual quantities, generally in quantities of up to 30% by weight, but occasionally in quantities of up to 60% by weight (particularly in the case of fillers). The molding compounds may be obtained in the usual way by mixing of the components. Most suitable fillers are glass fibres, as molding compositions according to the invention containing glass fibres show advantageous surface properties after molding.

The molding compounds of this invention can be manufactured from the individual components by all known mixing methods for thermoplastic material. Thus the solid ingredients can be mixed in mixing devices such as internal mixers, membrane mixers, rubber rolls. They can also be mixed while in a plastic or molten state in devices such as kneading or mixing screw extruders.

When the polymers of monomers corresponding to formula I, as defined, above are made by emulsion polymerisation and the polymers are primarily obtained in the form of an aqueous emulsion, it is of course also possible to mix this polymer emulsion with polymer emulsions of the other constituents of the alloy and to precipitate the mixture. Finally in cases where the polymer of the monomers of formula I and the other constituents are in powder form the powders can be mixed in conventional mixes and then the mixtures can be extruded to form a granular extrudate such as pellets which are then further processed to shaped articles.

The molding compounds are suitable for the production of moldings of all kinds. They generally show relatively high stability to ageing under the effect of environmental influences, chemicals, temperatures stressing and melt flow shearing during processing and molding. This improved stability is also reflected in improved properties, such as color, a shorter processing cycle, long-term stability in use, a minimal content of impurities and secondary products, better gloss and better mechanical properties.

EXAMPLES

The polymer according to the invention containing oxetanyl groups are obtained by copolymerization of the monomer corresponding to formula (Ia)

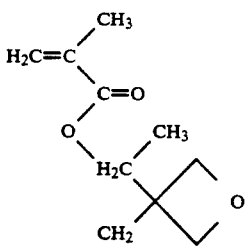

(Ia)

The quantities in the Examples are percentages by weight, unless otherwise indicated. The molecular weights of the polymers are characterised by the L value: L-value=$(\eta_{rel}-1)/0.005$, where $\eta_{rel}$ is the relative solution viscosity, as measured in dimethyl formamide at 25° C. for a concentration of 0.005 g/cm³.

1. Constituents of the molding compounds according to the invention and comparison molding compounds 1.1. Polymers containing oxetanyl groups A-1: Terpolymer produced by aqueous emulsion polymerisation of a mixture of α-methylstyrene, acrylonitrile and compound Ia in a ratio by weight of 63:31:6 with the sodium salt of disproportionated abietic acid as emulsifier at pH 10. The polymer was isolated by coagulation of the polymer latex with an aqueous magnesium sulfate/sodium acetate/acetic acid solution (pH 4.2) and working up in the usual way. The polymer has an L value of 60.

A-2: Terpolymer produced by aqueous emulsion polymerization of a monomer mixture of α-methylstyrene, acrylonitrile and compound Ia in a ratio by weight of 67.7:26.3:6 with the sodium salt of $C_{14-16}$ alkyl sulfonic acid as emulsifier at pH 8-9. The emulsion was coagulated with an aqueous magnesium sulfate solution. The polymer has an L value of 65.

A-3: Terpolymer produced by aqueous emulsion polymerization of a monomer mixture of styrene, acrylonitrile and compound Ia in a ratio by weight of 60:10:30 similar to A-1. The polymer has an L value of 59.

A-4: Emulsion polymer of compound Ia prepared in the same way as A-1 with an L value of 55.

1.2 Comparison polymers

C-1: Copolymer of α-methylstyrene and acrylonitrile in a ratio by weight of 59:31 prepared in the same way as A-1 with an L value of 61.

C-2: Copolymer of α-methylstyrene and acrylonitrile in a ratio by weight of 62:28 prepared in the same way as A-2 with an L value of 65.

1.3 Other components 1.3.1. Polyvinyl chloride having a K value of 70.

1.3.2. Graft polymer of 50% by weight polybutadiene with a mean particle diameter ($d_{50}$ value) of 380 nm (graft base) and 50% by weight of a styrene/acrylonitrile mixture (ratio by weight 72:28) as the graft shell (prepared by emulsion polymerization).

2. Preparation and testing of the molding compound 2.1. Examples 1 to 4

To prepare the molding compounds, the components shown in Table 1 are homogeneously mixed on mixing rolls in the quantities shown with addition of 1% by weight butyl tin mercaptide and 0.2% by weight ester wax and the resulting mixtures are subsequently rolled to form approximately 1 mm thick sheets.

The molding compounds are tested by storage in a Mathis oven at 200° C. and subsequent visual evaluation. The test times and results are shown in Table 2.

The results in Table 2 show that the molding compounds according to the invention show only slight discoloration after thermal ageing under the specified conditions shown whereas the comparison molding compounds are heavily discolored, indicating partial destruction thereof. In addition, the results in Table 2 show that the molding compounds according to the invention can be subjected to thermal ageing for much longer before they discolor to the same extent as the comparison molding compounds. These results reflect the superior ageing stability of the molding compounds according to the invention.

TABLE 1

Composition of molding compounds according to the invention and Comparison molding compounds (C) of Examples 1 to 4 (in % by weight)

| Example No. | A-1 | A-2 | A-3 | A-4 | C-1 | C-2 | 1.3.1 (PVC) | 1.3.2 (ABS) |
|---|---|---|---|---|---|---|---|---|
| 1 | 40 | — | — | — | — | — | 60 | — |
| 1-C | — | — | — | — | 40 | — | 60 | — |
| 2 | 30.8 | — | — | — | — | — | 60 | 9.2 |
| 2-C | — | — | — | — | 30.8 | — | 60 | 9.2 |
| 3 | — | 40 | — | — | — | — | 60 | — |
| 3-C | — | — | — | — | — | 40 | 60 | — |
| 4.1* | — | — | 6.2 | — | — | 21.6 | 65.7 | 6.5 |
| 4.2* | — | — | — | 2.0 | — | 22.6 | 68.6 | 6.8 |
| 4-C* | — | — | — | — | — | 23.1 | 70 | 6.9 |

*Molding compound additionally contains 3% by weight $TiO_2$ pigments

TABLE 2

Testing of molding compounds according to the invention and comparison molding compounds (C) of the Examples 1 to 4 by storage in a Mathis oven at 200° C.
(for composition, see Table 1)

| Example No. | Storage time in Mathis oven [minutes] | Visual evaluation | Storage time for same degree of discoloration as comparison compounds [minutes] |
|---|---|---|---|
| 1 | 20 | yellowish | >50 |
| 1-C | 20 | dark brown | |
| 2 | 20 | yellowish | >50 |
| 2-C | 20 | dark brown | |
| 3 | 25 | yellowish | >40 |
| 3-C | 25 | dark brown | |
| 4.1 | 20 | light brown | 40-50 |
| 4.2 | 20 | light brown | 40 |
| 4-C | 20 | brown | |

2.2. Example 5

1. Polymer A-2 and
2. Polymer C-2 for comparison are rolled on mixing rolls at 240° C. with addition of 0.5% ester wax. After 15 minutes, a slightly discolored sheet is obtained in the case of the first test whereas the second (comparison) test produces a brown-colored sheet. To obtain the same degree of discoloration as in the comparison product, the polymer according to the invention has to be rolled for about 35 to 40 minutes at 240° C.

The lighter discoloration of polymer A-2 compared with C-2 is indicative of less damage during thermal ageing and hence of increased ageing stability.

We claim:

1. A thermoplastic molding composition of:
   1) 1-99% by weight of resin-like copolymer containing 1 to 50% by weight of monomers corresponding to the formula (I)

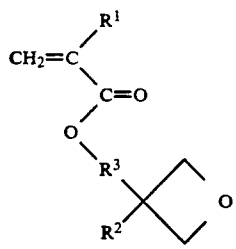

(I)

in which
R¹=H, CH₃
R²=C₁₋₈ alkylene
R³=C₁₋₄ alkyl
and vinyl monomers selected from the group consisting of styrene, α-methylstyrene, acrylonitrile, methacrylonitrile, carboxylic acid C₁₋₄ vinyl esters, acrylates, methacrylates, maleic acid derivatives, vinyl chloride, vinylidene chloride, and mixtures thereof, and 2) 99-1% by weight of a thermoplastic polymer selected from the group consisting of polystyrene, polymethyl methacrylate, polyvinyl chloride, styrene/acrylonitrile copolymers, α-methylstyrene/acrylonitrile copolymers, α-methylstyrene/acrylonitrile/methyl methacrylate copolymers, graft polymers of vinyl monomers on a rubber base, natural rubber, olefin rubbers, ethylene vinyl acetate copolymers, acrylate rubber, and diene/styrene block polymers and hydrogenation products thereof.

2. A thermoplastic molding composition according to claim 1, wherein the thermoplastic polymer is polyvinylchloride.

3. A thermoplastic molding composition according to claim 1, wherein the thermoplastic polymer is a graft polymer of ABS.

* * * * *